(12) United States Patent
Yang et al.

(10) Patent No.: US 11,388,907 B2
(45) Date of Patent: Jul. 19, 2022

(54) LYSOLECITHIN COMPOSITIONS AND THEIR USE

(71) Applicant: INTERNATIONAL FLAVORS & FRAGRANCES INC., New York, NY (US)

(72) Inventors: Ying Yang, Holmdel, NJ (US); Daniel Kaiping Lee, Morganville, NJ (US); Chii-Fen Wang, Princeton, NJ (US)

(73) Assignee: INTERNATIONAL FLAVORS & FRAGRANCES INC., New York, NY (US)

(*) Notice: Subject to any disclaimer, the term of this patent is extended or adjusted under 35 U.S.C. 154(b) by 813 days.

(21) Appl. No.: 15/520,237

(22) PCT Filed: Oct. 20, 2015

(86) PCT No.: PCT/US2015/056424
§ 371 (c)(1),
(2) Date: Apr. 19, 2017

(87) PCT Pub. No.: WO2016/064848
PCT Pub. Date: Apr. 28, 2016

(65) Prior Publication Data
US 2017/0311632 A1    Nov. 2, 2017

Related U.S. Application Data

(60) Provisional application No. 62/197,919, filed on Jul. 28, 2015, provisional application No. 62/065,865, filed on Oct. 20, 2014.

(51) Int. Cl.

| | | |
|---|---|---|
| *A23D 7/01* | (2006.01) | |
| *A23L 27/00* | (2016.01) | |
| *A23L 2/385* | (2006.01) | |
| *A23L 29/10* | (2016.01) | |
| *C11B 9/00* | (2006.01) | |
| *A23J 7/00* | (2006.01) | |
| *A23D 7/005* | (2006.01) | |
| *A23L 2/56* | (2006.01) | |
| *C12G 3/06* | (2006.01) | |
| *A23L 29/269* | (2016.01) | |
| *A23L 29/00* | (2016.01) | |
| *A23L 29/231* | (2016.01) | |
| *A23L 27/20* | (2016.01) | |
| *A23L 27/30* | (2016.01) | |
| *A23L 29/238* | (2016.01) | |
| *A23L 29/25* | (2016.01) | |

(52) U.S. Cl.
CPC ............... *A23D 7/01* (2013.01); *A23D 7/005* (2013.01); *A23J 7/00* (2013.01); *A23L 2/385* (2013.01); *A23L 2/56* (2013.01); *A23L 27/2026* (2016.08); *A23L 27/34* (2016.08); *A23L 27/80* (2016.08); *A23L 29/035* (2016.08); *A23L 29/10* (2016.08); *A23L 29/231* (2016.08); *A23L 29/238* (2016.08); *A23L 29/25* (2016.08); *A23L 29/27* (2016.08); *C11B 9/00* (2013.01); *C12G 3/06* (2013.01); *A23V 2002/00* (2013.01); *A23V 2250/1842* (2013.01); *A23V 2250/1846* (2013.01); *A23V 2250/506* (2013.01); *A23V 2250/5022* (2013.01); *A23V 2250/5072* (2013.01); *A23V 2250/5086* (2013.01); *A23V 2250/6402* (2013.01); *A23V 2250/642* (2013.01); *A23V 2250/6412* (2013.01); *A23V 2250/6418* (2013.01); *A23V 2250/6422* (2013.01)

(58) Field of Classification Search
None
See application file for complete search history.

(56) References Cited

U.S. PATENT DOCUMENTS

| | | | | |
|---|---|---|---|---|
| 5,635,206 | A * | 6/1997 | Ganter | A61K 9/1277 264/4.1 |
| 5,716,814 | A * | 2/1998 | Yesair | C12P 13/00 435/128 |
| 5,955,327 | A * | 9/1999 | Hirai | C12P 13/00 435/128 |
| 8,414,939 | B2 * | 4/2013 | Shen | A23G 4/066 426/5 |
| 2005/0227945 | A1 * | 10/2005 | Schmitt | C12P 7/6418 514/78 |
| 2010/0098821 | A1 * | 4/2010 | Comstock | A23D 7/011 426/330.3 |

OTHER PUBLICATIONS

Bishop, Mark. "Temperature Effect on Solubility", An Introduction to Chemistry, Chiral Publishing Company, 2013. [Retrieved on Nov. 13, 2018] Retrieved from the Internet: URL <http://preparatorychemistry.com/Bishop_solubility_temperature.htm> (Year: 2013).*

* cited by examiner

Primary Examiner — Stephanie A Cox

(57) ABSTRACT

A method of preparing a lysolecithin composition. The method includes the steps of (a) providing a lecithin mixture including a lecithin, water, and ethanol, (b) adding phospholipase A1 or A2 to the lecithin mixture; and (c) allowing an enzymatic reaction to occur so that at least 70% of the phospholipids in the lecithin are converted to lysophospholipids to obtain the lysolecithin composition. Also disclosed are a lysolecithin composition thus prepared, a flavor emulsion prepared from the lysolecithin composition, and a liquid beverage or liquid beverage concentrate containing the lysolecithin composition.

10 Claims, No Drawings

LYSOLECITHIN COMPOSITIONS AND THEIR USE

CROSS REFERENCE TO RELATED APPLICATION

This application is a national stage entry under 35 USC 371 for International Application No. PCT/US2015/056424, filed on Oct. 20, 2015. The international application claims the benefit of priority from U.S. application Ser. No. (i) 62/065,865, filed on Oct. 20, 2014 and U.S. application Ser. No. (ii) 62/197,919, filed on Jul. 28, 2015. The contents of all applications are incorporated herein by reference in their entirety.

BACKGROUND

Many flavoring compounds in beverage preparation are essential oils such as orange, lemon, and grapefruit or relatively nonpolar mixtures with limited water solubility such as strawberry watermelon, fruit punch, peach mango, etc. To create optically clear or transparent beverages containing flavor oils, emulsions are prepared using water and emulsifiers such as sucrose monopalmitate (SMP), polysorbate, and lecithin.

Multiple emulsifiers are often used as a surfactant system and step-by-step addition of individual emulsifier is required in some preparations. See International Application Publication WO2007/026271, Japanese Application Publication JP2006-249037, US Application Publications 2010/0136175, 2013/0004621, 2009/0285952, and 2007/0087104, and U.S. Pat. Nos. 6,902,756 and 6,716,473. A majority of these emulsifiers are non-natural. Consumers nowadays desire beverages containing only natural products.

In addition, beverages prepared from most of these emulsifiers are not clear at a low pH. Take SMP for example. Beverages containing SMP will develop cloudiness over time at a low pH.

Conventional lysolecithin gives off-tastes and off-odors, making it undesirable to be used as a sole emulsifier in beverages. See U.S. Pat. No. 5,995,327. Thus, it has been used as a co-emulsifier to improve the emulsification stability and transparency of other emulsifiers such as lecithin and polyglycerin fatty acid ester. See US Application Publication 2009/0285952.

There is a need for a natural emulsifier that can be used to prepare optically clear, stable liquid beverage concentrates and ready-to-drink beverages.

SUMMARY

The present invention is based on the discovery of certain lysolecithin compositions prepared from natural process and useful to prepare clear beverages at a low pH.

Accordingly, one aspect of this invention relates to a method of preparing a lysolecithin composition. The method includes the steps of:

(a) providing a lecithin mixture including a lecithin, water, and ethanol, in which the lecithin contains phospholipids at least 60%, preferably at least 70% and more preferably at least 80% by weight of the lecithin; and ethanol is present at a level of 6 to 25%, preferably 10 to 15% by weight of the lecithin mixture;

(b) adding phospholipase A1 or A2 to the lecithin mixture; and (c) allowing an enzymatic reaction to occur so that at least 70%, preferably at least 80% and more preferably at least 90%, of the phospholipids are converted to lysophospholipids to obtain the lysolecithin composition.

Optionally, the method includes the additional steps of:

(d) after the enzymatic reaction, deactivating phospholipase A1 or A2 to obtain a product mixture;

(e) adding acetone to the product mixture to obtain a process mixture containing a lysolecithin phase, in which the ratio between acetone and the product mixture can be 5:1 to 1:10, preferably 2:1 to 1:5; and (f) collecting the lysolecithin phase to obtain the lysolecithin composition.

After step (e) and before step (f), the process mixture can be stored at a temperature of 10° C. or below, preferably 6° C. or below (e.g., −5 to 6° C.), for a period of at least 10 minutes, preferably at least 1 hour (e.g., 1 to 24 hours) to facilitate the precipitation or floating of the lysolecithin phase.

Typically, the lysolecithin composition thus prepared is washed with acetone for at least three times (e.g., at least five times, and 4 to 8 times).

In some embodiments, the phospholipase A1 or A2 is present by weight of the lecithin mixture at a level of 1 to 15% (e.g., 1.25 to 12.5%, 3 to 10%, and 4 to 8%).

In the above described method, the enzymatic reaction can be carried out at a temperature of 25 to 50° C., preferably 35 to 45° C., for a period of 1 to 24 hours, preferably 2 to 10 hours.

The lysolecithin composition thus prepared typically contains the following: (i) lysophospholipids 50 wt % or greater, preferably 60 wt % or greater and more preferably 70 wt % or greater, (ii) free fatty acids 15 wt % or less, preferably 10 wt % or less and more preferably 5 wt % or less, and (iii) glycerophosphocholine 20 wt % or less, preferably 15 wt % or less and more preferably 10 wt % or less.

Another aspect of this invention relates to a lysolecithin composition prepared by the method described above.

Also within the scope of this invention is a flavor emulsion that contains flavor oil droplets, an aqueous phase, and a lysolecithin composition as an emulsifier. The flavor oil droplets are suspended in the aqueous phase. Each of them has a particle size of 1 to 1000 nanometers (e.g., 10 to 500 nanometers and 10 to 150 nanometers) and present at 1 to 20% (e.g., 1 to 10%) by weight of the flavor emulsion. The lysolecithin composition is present at a level of 0.1 to 30% (e.g., 1 to 10%) by weight of the flavor emulsion, and contains (i) lysophospholipids 50% or greater, preferably 60% or greater and more preferably 70% or greater by weight of the lysolecithin composition, (ii) one or more free fatty acids 15% or less, preferably 10% or less and more preferably 5% or less by weight of the lysolecithin composition, and (iii) glycerophosphocholine 20% or less, preferably 15% or less and more preferably 10% or less by weight of the lysolecithin composition.

In some embodiments, the flavor emulsion is free of a co-emulsifier. In other embodiments, the flavor emulsion contains one or more co-emulsifiers.

Still within the scope of this invention is a liquid beverage or liquid beverage concentrate that contains the flavor emulsion described above. The liquid beverage or liquid beverage concentrate, alcoholic or non-alcoholic, carbonated or non-carbonated, has a clarity of 5 NTU or less and a pH of 1 to 5.

The term "lysolecithin" refers to a class of compounds each of which has a partial hydrolysis product of a phosphatidylcholine resulting from removing one of the two fatty acid groups from the phosphatidylcholine.

The term "free fatty acid" refers to the fatty acid containing a free carboxyl group (—COOH). Free fatty acids include their salts and solvates.

The details of one or more embodiments of the invention are set forth in the description below. Other features, objects, and advantages of the invention will be apparent from the description and the claims.

DETAILED DESCRIPTION

Lysolecithin compositions are prepared by enzymatically hydrolyzing lecithin using a phospholipase in ethanol and water. It has been surprisingly found that ethanol at a concentration of 6-40% facilitates conversion of phosphatidylcholines ("PCs") to lysophosphatidylcholines ("LPCs") and minimizes certain other undesirable by-products such as glycerophosphocholine ("GPC"). The lysolecithin compositions of this invention, with or without a co-emulsifier, are suitable for preparing clear beverages under an acidic condition.

These lysolecithin compositions can be prepared by hydrolyzing a lecithin containing a high content of phospholipids such as PCs under a natural hydrolysis process with phospholipase A1 or A2.

Lecithins are mixtures of two primary components, namely phospholipids and triglycerides, with minor amounts of other constituents such as phytoglycolipids, phytosterols, tocopherols, and fatty acids. Phospholipids in lecithin include positively charged phospholipids (e.g., PC, phosphatidylethanolamine, and phosphatidylserine) and negatively charged phospholipids (e.g., phosphatidic acid, phosphatidylglycerol, and phosphatidylinositol).

Lecithins are prepared by extracting and purifying phospholipids from naturally occurring products including, but not limited to, soybeans, eggs, sunflower or rapeseed (canola) seeds, milk, marine sources, and cottonseeds. Food-grade lecithins are available in liquid, granular and powder from commercial sources and include, e.g., ALCOLEC Lecithins sold by American Lecithin Company (Oxford, Conn.) and TOPCITHIN, LECIPRIME, LECISOY, EMULFLUID, METARIN, EMULPUR, LECIGRAN, EPIKURON, LECIMULTHIN, EMULTOP, and OVOTHIN Lecithins sold by CARGILL (Mechelen, Belgium), and SOLEC Lecithins sold by DuPont Nutrition & Health (St. Louis, Mo.).

Lecithins may be deoiled (i.e., having 3% or less residual oil) or fractionated (i.e., separating soluble components and insoluble components in a solvent, which can be an alcohol such as ethanol or an ethanol-water mixture). During the fractionation process, a lecithin is mixed with an alcohol (such as ethanol or ethanol-water). Phosphatidylcholine has a good solubility in ethanol, whereas most other phospholipids do not dissolve well. The ethanol phase is separated from the lecithin sludge. Removal of ethanol yields a phosphatidylcholine-enriched lecithin.

The term "lecithin" as used herein refers to both a single type of lecithin (e.g., deoiled or fractionated) as well as to a mixture of lecithins.

Lecithins suitable for use in this invention are those containing a high content of phospholipids (e.g., at least 60 wt %, at least 70 wt %, and at least 80 wt %). Preferably, the lecithin contains at least 50 wt % (e.g., at least 60 wt %, at least 70 wt %, and at least 75 wt %) PCs.

It is preferred to have a high PC content in the starting lecithin. Using the method of this invention, the majority (e.g., at least 80 wt %) of the PCs are converted to LPCs to make a LPC-enriched final product.

Enzymatic hydrolysis of phosphatidylcholines can be shown in Scheme I below.

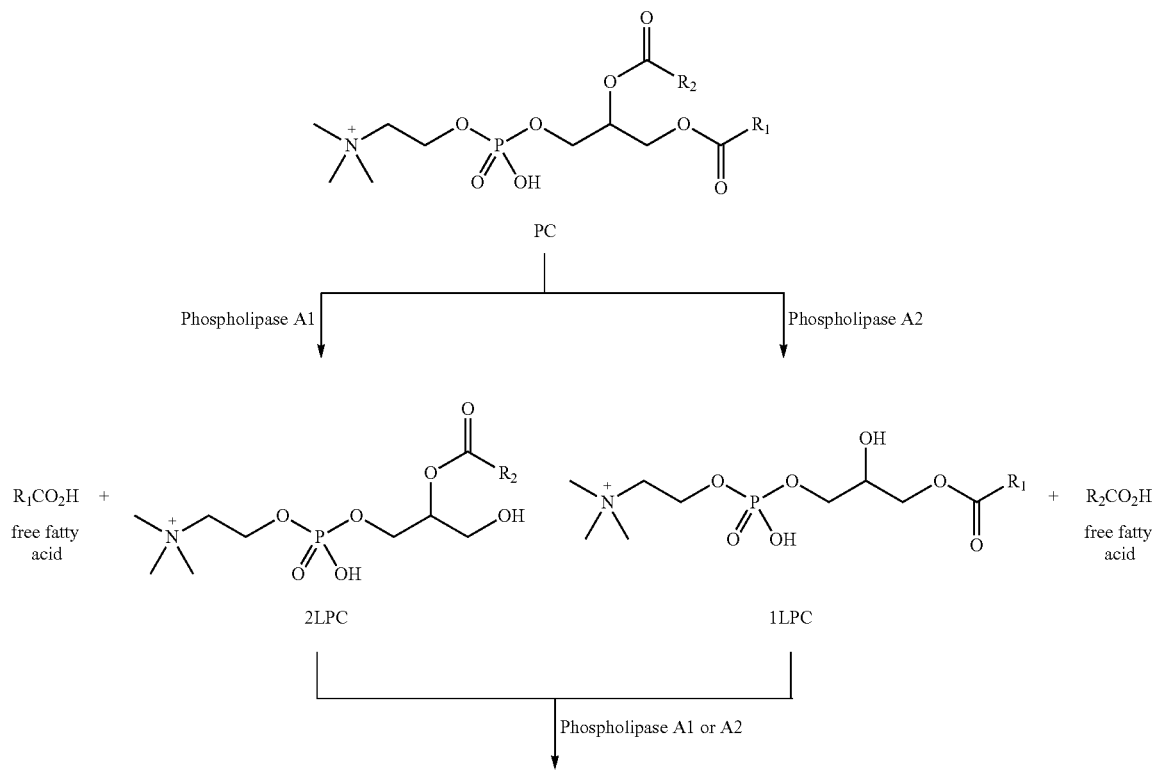

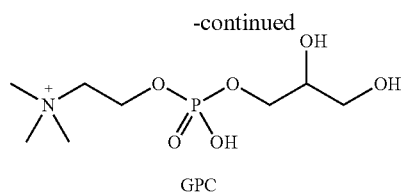

GPC

In Scheme I, each of $R_1$ and $R_2$, independently, is a saturated or unsaturated, branched or straight, aliphatic chain having 4 to 28 carbon atoms. They attach to the glycerophosphocholine moiety

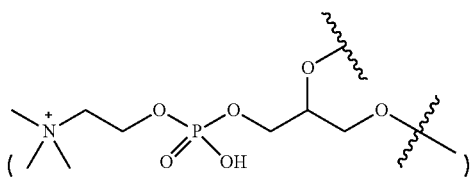

through a carbonyl group (—CO—). Upon hydrolysis, either one or both can be cleaved from the glycerophosphocholine moiety and form free fatty acids $R_1CO_2H$ and $R_2CO_2H$.

Examples of $R_1CO_2H$ and $R_2CO_2H$ are:

Myristoleic acid cis-$CH_3(CH_2)_3CH=CH(CH_2)_7COOH$,
Palmitoleic acid cis-$CH_3(CH_2)_5CH=CH(CH_2)_7COOH$,
Sapienic acid cis-$CH_3(CH_2)_8CH=CH(CH_2)_4COOH$,
Oleic acid cis-$CH_3(CH_2)_7CH=CH(CH_2)_7COOH$,
Elaidic acid trans-$CH_3(CH_2)_7CH=CH(CH_2)_7COOH$,
Vaccenic acid trans-$CH_3(CH_2)_5CH=CH(CH_2)_9COOH$,
Linoleic acid cis,cis-$CH_3(CH_2)_4CH=CHCH_2CH=CH(CH_2)_7COOH$,
Linoelaidic acid trans,trans-$CH_3(CH_2)_4CH=CHCH_2CH=CH(CH_2)_7COOH$,
α-Linolenic acid cis,cis,cis-$CH_3CH_2CH=CHCH_2CH=CHCH_2CH=CH-(CH_2)_7CO_2H$,
Arachidonic acid cis,cis,cis,cis-$CH_3(CH_2)_4CH=CHCH_2CH=CH-CH_2CH=CH(CH_2)_3COOH$,
Eicosapentaenoic acid cis,cis,cis,cis,cis-$CH_3CH_2CH=CHCH_2CH=CH-CH_2CH=CHCH_2CH=CHCH_2CH=CH(CH_2)_3COOH$,
Erucic acid cis-$CH_3(CH_2)_7CH=CH(CH_2)_{11}COOH$,
Docosahexaenoic acid $CH_3CH_2CH=CHCH_2CH=CHCH_2CH=CHCH_2CH=CH-CH_2CH=CHCH_2CH=CH(CH_2)_2COOH$,
Caprylic acid $CH_3(CH_2)_6COOH$,
Capric acid $CH_3(CH_2)_8COOH$,
Lauric acid $CH_3(CH_2)_{10}COOH$,
Myristic acid $CH_3(CH_2)_{12}COOH$,
Palmitic acid $CH_3(CH_2)_{14}COOH$,
Stearic acid $CH_3(CH_2)_{16}COOH$,
Arachidic acid $CH_3(CH_2)_{18}COOH$,
Behenic acid $CH_3(CH_2)_{20}COOH$,
Lignoceric acid $CH_3(CH_2)_{22}COOH$, and
Cerotic acid $CH_3(CH_2)_{24}COOH$.

Two enzymes, Phospholipases A1 and A2, can be used in the hydrolysis. Typically, Phospholipase A1 or A2 is added to the lecithin mixture at a level of 5-8 wt % (e.g., 6.25 wt %). Referring to Scheme I above, Phospholipase A1 recognizes the acyl bond at the first carbon of the glycerophosphocholine moiety and catalytically hydrolyzes PC to a 2-substituted lysophosphatidylcholine ("2LPC") and free fatty acid $R_1CO_2H$. The LPC thus obtained has a fatty acid chain at the second carbon atom. On the other hand, Phospholipase A2 releases free fatty acid $R_2CO_2H$ from the second carbon of glycerophosphocholine moiety to form a LPC having a fatty acid chain at the first carbon atom, i.e., 1-substituted lysophosphatidylcholine ("1LPC"). In certain embodiments, the lysolecithin compositions of this invention contain 1LPC, 2LPC, or a combination thereof.

Both 1LPC and 2 LPC can be further hydrolyzed to glycerophosphocholine (GPC) in the same enzymatic reaction. Unlike LPC, GPC is not an emulsifier. Its formation is undesirable and difficult to avoid in typical enzymatic reactions.

In this invention, it has been found that adding ethanol to the reaction mixture can facilitate conversion of PC to LPC at a high conversion rate and also minimize the formation of GPC. In some embodiments, the conversion rate of PC to LPC is at least 70% (e.g., at least 80%, at least 85%, at least 90%, and at least 95%) and the conversion rate of PC to GPC is less than 30% (e.g., less than 30%, less than 20%, less than 15%, less than 10%, and less than 5%). The reaction can be monitored by instrumental analysis such as mass spectrometry, nuclear magnetic resonance (e.g., $^{31}$P-NMR), and chromatography. The conversion rate can also be calculated based on the results from the instrumental analysis.

The amount of ethanol in the reaction mixture preferably is 6 to 40% (e.g., 8 to 20%, and 10 to 18%) by weight of the lecithin mixture. The amount of the lecithin is 1-30% (e.g., 5 to 25%) by weight of the lecithin mixture. Water is present at a level of 30-93% (e.g., 50-90%).

The enzymatic reaction is carried out at a predetermined temperature. A skilled person in the art would be able to find out without undue experimentation an optimal temperature so that a lysolecithin composition with a high content of LPC is obtained at a high yield. For example, the reaction occurs at 0-60° C. (e.g., 25-50° C., and 35-45° C.) for a time period of 5 minutes to 48 hours (e.g., 30 minutes to 36 hours, 1-24 hours, 1-10 hours, and 2-5 hours).

Optionally, the enzymatic reaction is quenched by deactivating enzyme Phospholipase A1 or A2 when a desired PC-to-LPC conversion rate is achieved. The enzyme can be deactivated by heat the reaction mixture to 60-100° C. (e.g., 70-100° C., 80-100° C., and 90-100° C.) for 2 minutes to 1 hour (e.g., 5-30 minutes). The enzyme can also be quenched by heating the reaction mixture in a microwave oven for 30 seconds to 30 minutes. Adding acetone or other organic solvent also deactivates the enzyme and thus stops the reaction. In some embodiments, the pH of the reaction mixture is adjusted to near neutral (e.g., pH 5-9) before deactivation to avoid hydrolyzing LPC under acidic or basic conditions at a high temperature.

The product mixture thus obtained contains the lysolecithin composition, fatty acids, and deactivated enzyme. The lysolecithin composition can be isolated from the reaction mixture using conventional methods such as extraction with organic solvents, chromatography, dialysis, See U.S. Pat.

Nos. 5,955,327 and 3,592,829, and Gjone et al., Journal of Lipid Research 1(1), 66-71 (1959).

Preferably, the lysolecithin composition is purified using acetone extraction. The ratio between acetone and the product mixture can be at the range of 20:1 to 1:20, preferably 5:1 to 1:10, more preferably 3:1 to 1:5, and even more preferably 2:1 to 1:2. Acetone is added to the product mixture and mixed well to obtain a process mixture. A solid lysolecithin composition is then formed, either precipitated at the bottom or floating on the top of the process mixture, depending on the amount of acetone added and the density of the liquid phase. To facilitate the formation of the solid lysolecithin composition, the process mixture can be placed at a low temperature (e.g., less than 15° C., less than 10° C., less than 6° C., −15 to 10° C., 0-10° C., and 2-6° C.) for a time period of at least 5 minutes (e.g., at least 10 minutes, 30 minutes to 1 week, 1-48 hours, 2-24 hours, and 3-10 hours).

The solid lysolecithin composition is then collected by a conventional means such as filtration, centrifugation, and separation funnel. The collected lysolecithin composition can be washed with acetone multiple times (e.g., at least three times, at least 4 times, at least five times, at least six times, and 3-10 times) to remove residual free fatty acids.

The lysolecithin composition thus prepared contains (i) lysophospholipids or LPC 50% or greater (preferably 60% or greater, more preferably 70% or greater, and even more preferably 80% or greater) by weight of the lysolecithin composition, (ii) the total amount of free fatty acids 15% or less (preferably 10% or less, more preferably 5% or less, and even more preferably 2% or less) by weight of the lysolecithin composition, and (iii) GPC 20% or less (preferably 15% or less, more preferably 10% or less, and even more preferably 5% or less) by weight of the lysolecithin composition. The content of PC in the lysolecithin composition is 10 wt % or less (e.g., 5 wt % or less and 2 wt % or less).

Not to be bound by any theory, it is believed that free fatty acids and GPC contribute to the cloudiness of a beverage. It is desirable that the contents of free fatty acids and GPC are limited to the amounts as mentioned above.

The lysolecithin composition can also contain other compounds such as lysophosphatidic acid (e.g., 5 wt % or less), lysophosphatidylinositol (e.g., 5 wt % or less), lysophosphatidylglycerol (e.g., 5 wt % or less), lysophosphatidylethanolamine (e.g., 15 wt % or less), and lysophosphatidylserine (e.g., 5% or less).

The lysolecithin composition of this invention is an ideal emulsifier useful in preparing flavor emulsions, clear liquid beverages, and liquid beverage concentrates. Unlike many other emulsifiers, this composition is stable at a low pH (e.g., 1-7, 1-5, 2-5, 1-4, and 1-3). A clear beverage prepared from this lysolecithin composition does not turn cloudy at a low pH during its shelf life (e.g., at least 1 day, at least 3 days, at least 1 week, at least 1 month, and at least 6 months).

Many flavoring compounds in beverage preparation are essential oils such as orange, lemon, and grapefruit, which have limited water solubility. For preparing optically clear beverages, desirable flavor emulsions (e.g., microemulsions and nanoemulsions) are visually translucent or transparent, are thermodynamically stable, and contain flavor oil droplets having a particle size between 0.1 to 1000 nanometers (e.g., 2 to 500 nanometers, 2 to 200 nanometers, and 5 to 150 nanometers). A nanoemulsion refers to flavor oil droplets in size of 200 nanometers or less (e.g., 50 to 150 nanometers) in diameter. See Mason et al. 2006, *J Physics: Condensed Matter* 18, 635-66.

These flavor emulsions can have a clarity (i.e., turbidity) of 800 or less Nephelometric Turbidity Units ("NTU;" e.g., 200 NTU or less and 100 NTU or less). Turbidity can be measured following the procedures well known in the art, e.g., Fernandez et al., Food Chemistry (2000), 71, 563-66; and Christensen et al., Journal-American Water Works Association (2003), 95, 179-189.

When the flavor emulsions are diluted into a beverage to a certain degree, the resultant beverage can have a clarity of 10 NTU or less, and preferably 5 NTU or less, more preferably 2 NTU or less, and even more preferably 1 NTU or less. In some embodiments, it is desirable that the beverage is clear. The term "clear" refers to a matter having a turbidity of 5 NTU or less.

To prepare an emulsion, the lysolecithin composition is mixed with an aqueous phase and a flavor oil using conventional techniques. Briefly, a flavor emulsion is typically prepared by mixing an aqueous and oil phases, and subjecting the mixture to homogenization several times, or, in the terminology of the art, to make more than one "pass." In some embodiments, a pre-emulsion step (i.e., a high shear mixing step) is carried out to set the initial particle size prior to high-pressure homogenization. The speed of high shear mixing may range from 3,000 rpm to 20,000 rpm and the time of mixing may range from 5 to 30 minutes. A high-pressure homogenizer (e.g., commercially available Niro Panda 2000) or other type of homogenizer (e.g., MICROFLUIDIZER commercially available from Microfluidics or EMULSIFLEX commercially available from Avestin) is subsequently used to prepare the flavor emulsions. Homogenization can be carried out at 3,000/300 psi to 10,000/1,000 psi using a two-stage homogenizer for two, three, or more passes; or 6,500/500 psi to 20,000/2,000 psi for one, two or more passes.

The weight ratio between the lysolecithin composition and the flavor oil can be in the range of 1:5 to 5:1 (e.g., 1:3 to 1:1).

The flavor emulsions thus prepared each have flavor oil droplets, an aqueous phase, and the lysolecithin composition as an emulsifier.

Flavor oils suitable for preparing the nanoemulsions of this invention contain one or more volatile compounds. A variety of flavors can be used in accordance with the present invention. Flavors may be chosen from synthetic flavors, flavoring oils and oil extracts derived from plants, leaves, flowers, fruits, and combinations thereof. Representative flavor oils include, but are not limited to, spearmint oil, cinnamon oil, peppermint oil, clove oil, bay oil, thyme oil, cedar leaf oil, oil of nutmeg, oil of sage, and oil of bitter almonds. Also useful are artificial, natural or synthetic fruit flavors such as vanilla, chocolate, coffee, cocoa and citrus oil, including lemon, orange, grape, lime and grapefruit, and fruit essences including apple, pear, peach, strawberry, watermelon, raspberry, cherry, plum, pineapple, apricot and so forth. These flavors can be used individually or in admixture.

Volatile compounds in the flavor oils may include, but are not limited to, acetaldehyde, dimethyl sulfide, ethyl acetate, ethyl propionate, methyl butyrate, and ethyl butyrate. Flavors containing volatile aldehydes or esters include, e.g., cinnamyl acetate, cinnamaldehyde, citral, diethylacetal, dihydrocarvyl acetate, eugenyl formate, and p-methylanisole. Further examples of volatile compounds that may be present in the flavor oils include acetaldehyde (apple); benzaldehyde (cherry, almond); cinnamic aldehyde (cinnamon); citral, i.e., alpha citral (lemon, lime); neral, i.e., beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter, cheese); valeraldehyde (butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., melonal (melon); 2-6-dimethyloctanal (green fruit); and 2-dodecenal (citrus, mandarin); cherry; or grape and mixtures thereof. The composition may also contain taste modulators and artificial sweeteners.

The physical, chemical, and odor properties of selected volatile compounds are presented in Table 1.

TABLE 1

| Compound | MW (g/mol) | Boiling Point (° C.) | Water Solubility (g/L, approx.) | Odor Descriptors* |
| --- | --- | --- | --- | --- |
| acetaldehyde | 44.05 | 21 | Soluble | pungent; ethereal |
| dimethyl sulfide | 62.02 | 36 | Insoluble | cabbage |
| ethyl acetate | 88.11 | 77 | 90 | ethereal; fruity |
| ethyl propionate | 102.13 | 99 | 14 | sweet; fruity; ethereal |
| methyl butyrate | 102.13 | 102 | 15 | fruity; pineapple |
| ethyl butyrate | 116.16 | 121 | 6 | fruity; pineapple |

*The Good Scents Company and Merck Index, 12$^{th}$ Ed.

In general, the flavor emulsion of the invention contains a flavor oil 30% or less by weight of the emulsion. In certain embodiments, the flavor emulsion contains a flavor oil between 0.1 to 20%. In other embodiments, the flavor emulsion of the invention contains a flavor oil between 1 to 5%.

Turning to the aqueous phase, it can contain in water one or more adjuvants such as a viscosity control agent, a density modifier, a stabilizer, a solubilizing agent, and a pH modifier.

Exemplary viscosity control agents are natural or modified carbohydrate gums including seaweed extracts such as agar, algins, and carrageenans; plant seed gums such as locust bean gum and guar gum; polysaccharide gums such as xanthan gum; plant exudates such as gum arabic, gum tragacanth, and gum karaya; and, synthetic gums such as sodium carboxymethylcellulose, hydroxypropylmethylcellulose, methylcellulose, and microcrystalline cellulose. Other suitable viscosity control agents, which may be polymeric or colloidal, include modified cellulose polymers such as methylcellulose, hydoxyethylcellulose, hydrophobically modified hydroxyethylcellulose, and cross-linked acrylate polymers such as Carbomer, hydrophobically modified polyethers. Optionally, silicas, either hydrophobic or hydrophilic, can be included at a concentration from 0.01 to 20%, more preferable from 0.5 to 5%, by the weight of the emulsion composition. Examples of hydrophobic silicas include silanols, surfaces of which are treated with halogen silanes, alkoxysilanes, silazanes, and siloxanes, such as SIPERNAT D17, AEROSIL R972 and R974 available from Degussa. Exemplary hydrophilic silicas are AEROSIL 200, SIPERNAT 22S, SIPERNAT 50S (available from Degussa), and SYLOID 244 (available from Grace Davison).

Nonlimiting examples of a solubilizing agent include surfactants (e.g., SLS and Tween 80), acidic compounds (e.g., mineral acids such as sulfuric acid, hydrochloric acid, nitric acid, and phosphoric acid, and carboxylic acids such as acetic acid, citric acid, gluconic acid, glucoheptonic acid, and lactic acid), basic compounds (e.g., ammonia, alkali metal and alkaline earth metal hydroxides, primary, secondary, or tertiary amines, and primary, secondary, or tertiary alkanolamines), ethyl alcohol, glycerol, glucose, galactose, inositol, mannitol, glactitol, adonitol, arabitol, and amino acids.

Suitable density modifiers include hydrophobic materials and materials having a desired molecular weight (e.g., higher than 12,000), such as silicone oils, petrolatums, getable oils, especially sunflower oil and rapeseed oil, and hydrophobic solvents having a desired density (e.g., less than 1,000 Kg/m$^3$ at 25° C., such as limonene and octane. See WO 2000/059616, EP 1 502 646, and EP 2 204 155.

In some embodiments, a stabilizer (e.g., a colloidal stabilizer) is added to stabilize the emulsion. Examples of colloidal stabilizers are polyvinyl alcohol, cellulose derivatives such hydroxyethyl cellulose, polyethylene oxide, copolymers of polyethylene oxide and polyethylene or polypropylene oxide, or copolymers of acrylamide and acrylic acid.

In some embodiments, one or more pH modifiers are included in the aqueous phase to adjust the pH value of the flavor emulsion. The pH modifiers can also assist in stabilizing the emulsion or achieving a desired taste. Exemplary pH modifiers are metal hydroxides (e.g., LiOH, NaOH, KOH, and Mg(OH)$_2$), metal carbonates and bicarbonates (e.g., CsCO$_3$, Li$_2$CO$_3$, K$_2$CO$_3$, NaHCO$_3$, and CaCO$_3$), metal phosphates/hydrogen phosphates/dihydrogen phosphates, metal sulfates, ammonia, mineral acids (HCl, H$_2$SO$_4$, H$_3$PO$_4$, and HNO$_3$), carboxylic acids (e.g., acetic acid, citric acid, lactic acid, benzoic acid, and sulfonic acids), and amino acids. A skilled person in the art can determine which pH modifier to use and how much to use so that the pH of the flavor emulsion is adjusted to 1-9 (e.g., 1-7, 1-5, 2-5, 1-4, and 1-3).

The emulsifier lysolecithin composition is present at a level of 0.1-30% by weight of the flavor emulsion. The amount of the composition is determined by the amount of flavor oil, the flavor oil droplet size, and the existence of an adjuvant. Typically, the weight ratio between the lysolecithin composition and the flavor oil is 1:100 to 100:1, preferably, 1:10 to 10:1, and more preferably, 1:5 to 5:1.

In some embodiments, the lysolecithin composition is used without a co-emulsifier. Namely, the flavor emulsion is free of a co-emulsifier. In other embodiments, the flavor emulsion contains one or more co-emulsifiers (e.g., one co-emulsifier, two co-emulsifiers, and three co-emulsifiers).

Exemplary co-emulsifiers are standard lecithins, fractioned lecithins, polyoxyethylene sorbitan fatty acid esters, ammonium phosphatides, mono- or diglycerides of fatty acids including distilled monoglycerides, acetic acid esters of mono- and diglycerides (Acetem), lactic acid esters of mono- and diglycerides of fatty acids (Lactem), citric acid esters of mono and diglycerides of fatty acids (Citrem), mono and diacetyl tartaric acid esters of mono and diglycerides of fatty acids (Datem), succinic acid esters of monoglycerides of fatty acids (SMG), ethoxylated monoglycerides, sucrose esters of fatty acids, sucroglycerides, polyglycerol esters of fatty acids, polyglycerol polyricinoleate, propane-1,2 diol esters of fatty acids, thermally oxidized soya bean oil interacted with mono- or diglycerides of fatty acids, sodium stearoyl lactylate (SSL), calcium stearoyl lactylate (CSL), stearyl tartrate, sorbitan esters of fatty acids, polyglycerol esters of interesterified castor oil acid (E476), sodium stearoyllatylate, sodium lauryl sulfate and polyoxyethylene stearate such as for instance polyoxyethylene(8)stearate and polyoxyethylene(40)stearate, polyoxyethylated hydrogenated castor oil (for instance, such sold under the trade name CREMO-PHOR), block copolymers of ethylene oxide and propylene oxide (for instance as sold under the trade name PLURONIC or the trade name POLOXAMER), polyoxyethylene fatty alcohol ethers, and polyoxyethylene stearic acid ester. Examples of polyoxyethylene sorbitan fatty acid esters include polyoxyethylen sorbitan monolaurate (polysorbate 20), polyoxyethylen sorbitan monooleate (polysorbate 80), polyoxyethylen sorbitan monopalmitate (polysorbate 40), polyoxyethylen sorbitan monostearate (polysorbate 60), polyoxyethylen sorbitan tristearate (polysorbate 65). Examples of sorbitan esters of fatty acids are sorbitan monostearate, sorbitan tristearate, sorbitan monolaurate, sorbitan monooleate, sorbitan monopalmitate, and saccharose esters of fatty acids.

The flavor emulsions described above can be used in a variety of consumer, food, or pharmaceutical products. In particular, they find application in gums, confections, oral care products, beverages, snacks, dairy products, soups, sauces, condiments, cereals, and baked goods.

In specific embodiments, the flavor emulsions are used in beverages and beverage liquid concentrates. Accordingly, in addition to flavor emulsions, the present invention also provides optically clear final beverage products or beverage liquid concentrates containing one of the flavor emulsions of the invention.

In some embodiments, the flavor emulsion is dosed at a level between 1 ppm to 60% (e.g., 1 ppm to 20% and 5 ppm to 5%) by weight of the final beverage product so that the product contains a flavor oil 0.01 ppm to 10% (0.1 ppm to 5%, 0.5 ppm to 1%, and 1 ppm to 100 ppm). Using the flavor emulsion of this invention, the final beverage product thus prepared is clear, having a turbidity of 5 NTU or below (e.g., 2 NTU or below, and 1 NTU or below).

As used herein, the term "beverage" means a liquid that has been prepared either by the standard soft drink (i.e., ready-to-drink) preparation procedure or by diluting a concentrate to provide a beverage in a potable, consumable form. Beverages can be alcoholic or non-alcoholic, carbonated or non-carbonated, or carbonated alcoholic. Examples are coffee, tea, wine, beverages containing wine, beer, beverages containing beer, liqueurs, schnapps, brandies, sodas containing fruit, isotonic beverages, soft drinks, powder drinks, nectars, fruit and vegetable juices, fruit or vegetable preparations, and instant beverages such as instant cocoa beverages, instant tea beverages and instant coffee beverages.

The term "liquid" refers to a non-gaseous, flowable, fluid composition at room temperature (i.e., 70° F.).

As used herein, the term "beverage liquid concentrate" means a liquid composition that can be diluted with another liquid, such as an aqueous, potable liquid to provide a final beverage or added to a food product prior to being consumed. In some aspects, the concentrate is non-potable due to acidulant content and/or flavor intensity. By way of example to clarify the term "concentration," a concentration of 75 times (i.e., "75×") would be equivalent to 1 part concentrate to 74 parts water (or other potable liquid) to provide the final beverage. In other words, the flavor profile of the final beverage is taken into account when determining an appropriate level of dilution, and thus concentration, of the beverage liquid concentrate. The dilution factor of the concentrate can also be expressed as the amount necessary to provide a single serving of concentrate.

The viscosity, pH, and formulations of the concentrates will depend, at least in part, on the intended dilution factor. In one approach, a moderately concentrated product may be formulated to be diluted by a factor of at least 5 times to provide a final beverage, which can be, for example, an 8-ounce beverage. In one aspect, the concentrate is formulated to be diluted by a factor of 5 to 15 times to provide a final beverage. In this form, the liquid concentrate has a pH of 1.8 to 4, or more particularly, 1.8 to 2.9, 2 to 3.1, or 2 to 2.5; and a viscosity of 7.5 to 100 cP, 10 to 100 cP, 15 to 100 cP, 10 to 50 cP, or 10 to 20 cP, as measured using Spindle S00 at 50 rpm and 20° C. with a Brookfield DVII+Pro Viscometer. In some embodiments, the concentrate includes at least 0.1 to 15% acidulant by weight of the concentrate. Any edible, food grade organic or inorganic acid can be used, if desired. Examples include citric acid, malic acid, succinic acid, acetic acid, hydrochloric acid, adipic acid, tartaric acid, fumaric acid, phosphoric acid, lactic acid, sodium acid pyrophosphate, salts thereof, and combinations thereof. The selection of the acidulant may depend, at least in part, on the desired pH of the concentrate and/or taste imparted by the acidulant to the diluted final beverage. In another aspect, the amount of acidulant included in the concentrate may depend on the strength of the acid. For example, a larger quantity of lactic acid would be needed in the concentrate to reduce the pH in the final beverage than a stronger acid, such as phosphoric acid. In some embodiments, a buffer can be added to the concentrate to provide for increased acid content at a desired pH. Suitable buffers include, for example, a conjugated base of an acid, gluconate, acetate, phosphate or any salt of an acid (e.g., sodium citrate and potassium citrate). In other instances, an undissociated salt of the acid can buffer the concentrate.

The beverages or concentrates of the invention can include one or more juices or juice concentrates (such as at least a 4× concentrated product) from fruits or vegetables for bulk solid addition. In one aspect, the juice or juice concentrate may include, for example, coconut juice (also commonly referred to as coconut water), apple, pear, grape, orange, potato, tangerine, lemon, lime, tomato, carrot, beet, asparagus, celery, kale, spinach, pumpkin, strawberry, raspberry, banana, blueberry, mango, passion fruit, peach, plum, papaya, and combinations. The juice or juice concentrates may also be added as a puree, if desired.

As indicated, concentrates can be added to potable liquids to form flavored beverages. In some aspects, the concentrate may be non-potable (such as due to the high acid content and intensity of flavor). For example, the beverage concentrate can be used to provide flavor to water, cola, carbonated water, tea, coffee, seltzer, club soda, the like, and can also be used to enhance the flavor of juice. In one embodiment, the beverage concentrate can be used to provide flavor to alcoholic beverages, including but not limited to flavored champagne, sparkling wine, wine spritzer, cocktail, martini, or the like. In particular embodiments, the concentrate is used in an optically clear beverage.

Beverage concentrates can also be combined with a variety of food products to add flavor to the food products. For example, concentrates can be used to provide flavor to a variety of solid, semi-solid, and liquid food products, including but not limited to oatmeal, cereal, yogurt, strained yogurt, cottage cheese, cream cheese, frosting, salad dressing, sauce, and desserts such as ice cream, sherbet, sorbet, and Italian ice. Appropriate ratios of the beverage concentrate to food product or beverage can readily be determined by one of ordinary skill in the art.

In addition to beverages and concentrates, the flavor emulsions of this invention can also be used in the following products:

a. Confectioneries, preferably selected from the group consisting of chocolate, chocolate bar products, other products in bar form, fruit gums, hard and soft caramels and chewing gum
   i. Gum
      1. Gum base 20-25%, natural latex chicle gum, most current chewing gum bases also presently include elastomers, such as polyvinylacetate (PVA), polyethylene, (low or medium molecular weight) polyisobutene (PIB), polybutadiene, isobutene-isoprene copolymers (butyl rubber), polyvinylethylether (PVE), polyvinylbutyether, copolymers of vinyl esters and vinyl ethers, styrene-butadiene copolymers (styrene-butadiene rubber, SBR), or vinyl elastomers, for example based on vinylacetate/vinyllaurate, vinylacetate/vinylstearate or ethylene/vinylacetate, as well as mixtures of the mentioned elastomers, as described for example in EP 0 242 325, U.S. Pat. Nos. 4,518,615, 5,093,136, 5,266,336, 5,601,858 or U.S. Pat. No. 6,986,709
      2. Powdered sugar 45-50%
      3. glucose 15-17%
      4. starch syrup 10-13%
      5. plasticizer 0.1%
      6. flavor 0.8-1.2%
      The components described above were kneaded by a kneader according to the foregoing formulation to provide a chewing gum. Encapsulated Flavor or sensate is then added and blended till homogeneous.
   ii. Breath Fresheners
   iii. Orally Dissolvable Strips
   iv. Chewable Candy
   v. Hard Candy
b. Baked products, preferably selected from the group consisting of bread, dry biscuits, cakes and other cookies;
c. snack foods, preferably selected from the group consisting of baked or fried potato chips or potato dough products, bread dough products and corn or peanut-based extrudates;
   i. Potato, tortilla, vegetable or multigrain chips
   ii. Popcorn
   iii. Pretzels
   iv. Extruded stacks
d. Cereal Products preferably selected from the group consisting of breakfast cereals, muesli bars and pre-cooked finished rice products
e. Spice blends and consumer prepared foods
   i. Powder gravy, sauce mixes
   ii. Condiments
   iii. Fermented Products
f. Ready to heat foods: ready meals and soups, preferably selected from the group consisting of powdered soups, instant soups, precooked soups
   i. Soups
   ii. Sauces
   iii. Stews
   iv. Frozen entrees
g. Dairy Products milk products, preferably selected from the group consisting of milk beverages, ice milk, yogurt, kefir, cream cheese, soft cheese, hard cheese, powdered milk, whey, butter, buttermilk and partially or fully hydrolyzed milk protein-containing products Flavored milk beverages
   i. Yoghurt
   ii. Ice cream
   iii. Bean Curd
   iv. Cheese
h. Soya protein or other soybean fractions, preferably selected from the group consisting of soya milk and products produced therefrom, soya lecithin-containing preparations, fermented products such as tofu or tempeh or products produced therefrom and soy sauces;
i. meat products, preferably selected from the group consisting of ham, fresh or raw sausage preparations, and seasoned or marinated fresh or salt meat products
j. Eggs or egg products, preferably selected from the group consisting of dried egg, egg white and egg yolk
k. and oil-based products or emulsions thereof, preferably selected from the group consisting of mayonnaise, remoulade, dressings and seasoning preparations
l. fruit preparations, preferably selected from the group consisting of jams, sorbets, fruit sauces and fruit fillings; vegetable preparations, preferably selected from the group consisting of ketchup, sauces, dried vegetables, deep-frozen vegetables, precooked vegetables, vegetables in vinegar and preserved vegetables.

Other modifications of this invention will be readily apparent to those skilled in the art. Such modifications are understood to be within the scope of this invention. In addition, all parts, percentages, proportions, and ratios typically refer to herein and in the claims are by weight unless otherwise specified.

All parts, percentages and proportions refer to herein and in the claims are by weight unless otherwise indicated.

The values and dimensions disclosed herein are not to be understood as being strictly limited to the exact numerical values recited. Instead, unless otherwise specified, each such value is intended to mean both the recited value and a functionally equivalent range surrounding that value. For example, a value disclosed as "50%" is intended to mean "about 50%."

All publications cited herein are incorporated by reference in their entirety.

The following examples are provided as specific embodiments of the present invention.

Example 1

A lysolecithin composition of this invention, i.e., Composition 1, was prepared following the procedure described below.

More specifically, a lecithin mixture was prepared in a reaction flask by mixing 20 g of lecithin (15% by weight of the lecithin mixture), 13.33 g of ethanol (10%), and 100 g of water (75%). The mixture was then warmed to 40° C. Under stirring, 0.25 g of PLA1 (Phospholipase A1 extracted from *Thermomyces lanuginosus*, commercially available as Lecitase® Ultra from Novozymes Corp, Denmark) was added to start an enzymatic reaction. After 24 hours, the reaction flask was immersed in boiling water for 15 minutes to quench the reaction. After cooling to room temperature, Composition 1 was obtained without further separation.

Composition 1 was analyzed using $^{31}$P-NMR. The analytic method used a sodium cholate detergent system for sample preparation. See MacKenzie et al., *J. Am. Oil Chem. Soc.* (2009), 86, 757-63; and Glonek, *J. Am. Oil Chem. Soc.* (1998), 75, 569-73. Quantitative phosphorous NMR spectra were obtained using inverse gated proton decoupling for suppression of the Nuclear Overhauser effect. Phospholipid concentrations were determined by integration of the phospholipid resonance signals detected from each sample and integration of $^{31}$P-NMR peak from an internal standard.

Composition 1 was found to contain by mole 60% LPC, 10% PC, 17% GPC, and 9.1% lysophosphatidylethanolamine.

Example 2

Another lysolecithin composition of this invention, i.e., Composition 2, was prepared following the same procedure described in Example 1 except that 20 g of ethanol (15%) and 93.3 g of water (70%) was used instead of 10% of ethanol and 75% of water.

Analyzed by $^{31}$P-NMR, Composition 2 contained by mole 72.1% LPC, 9.5% PC, 2.1% GPC, and 11.9% lysophosphatidylethanolamine.

Example 3

Composition 3 of this invention was prepared following the procedure described below.

More specifically, a lecithin mixture was prepared in a reaction flask by mixing 40 g of lecithin (15% by weight of the lecithin mixture), 40 g of ethanol (15%), and 186 g of water (75%). The mixture was then warmed to 40° C. Under stirring, 2.5 g of PLA1 (Lecitase® Ultra from Novozymes Corp, Denmark) was added to start an enzymatic reaction. After 3 hours, the reaction flask was immersed in boiling water for 15 minutes to quench the reaction. After the reaction mixture (about 133 mL) was cooled to room temperature (e.g., 25° C.), acetone (133 mL) was added and stirred using an overhead mixer for 20 minutes. The resultant mixture was then transferred to a refrigerator and stored at 4-6° C. for 5 hours. The solid lysolecithin was precipitated at the bottom and collected by decanting the upper liquid phase. Another 133 g of acetone was added. The lysolecithin-acetone mixture was stirred for 20 minutes to wash the solid lysolecithin. Again, the solid lysolecithin was precipitated at the bottom and collected by removing the liquid phase. The washing step was repeated three times. The lysolecithin composition, i.e., Composition 3, thus obtained was blown dried with nitrogen gas to yield 12.1 g of a yellow solid.

Composition 3 was analyzed using $^{31}$P-NMR and contained 60.3% LPC, 1.1% PC, 0.8% GPC, and 13.5% free fatty acids.

Example 4

Composition 4 of this invention was prepared following the same procedure as Composition 3 except that when extracting/washing with acetone, the mixture was vortexed for 10 minutes instead of mixing with an overhead mixer.

Composition 4 was analyzed using $^{31}$P-NMR and contained 57.1% LPC, 0% PC, 1.8% GPC, and 13% free fatty acids.

Comparative Composition 1'

Comparative Composition 1' was prepared following the same procedure as Composition 1 except that no ethanol was used.

Comparative Composition 1' was analyzed with $^{31}$P-NMR. It contained by mole 38% LPC, 11% PC, 38% GPC, and 11.2% LPE.

Example 5

A flavor emulsion of this invention, i.e., Emulsion I, was prepared following the procedure described below.

More specifically, 600 grams of sorbitol solution, 245 grams of glycerin, and 100 grams of propylene glycol were mixed using an overhead mixer until homogenous to obtain an aqueous phase. 25 grams (i.e., 2.5% the final emulsion) of Composition 3 prepared in Example 3 above was gradually added to the aqueous phase under high shear mixing using the Silverson high shear mixer, Model L4RT, (SILVERSON) at 6,500 rpm for 3 minutes. A pre-emulsion was formed by mixing 30 grams of Flavor Oil Orange (Commercially available from International Flavors and Fragrances, Union Beach, N.J.) and the aqueous phase under high shear mixing at 6,500 rpm for 3 minutes. The pre-emulsion was further processed in a high-pressure Niro Panda 2000 homogenizer (Niro Soavi, Hudson, Wis.) for three passes at about 5,000/500 psi to obtain Emulsion I.

The particle size of Emulsion I was measured using a Malvern Zetasizer (Malvern Instruments Ltd, Worcestershire, UK). The emulsion was diluted to 1 wt % with water for the particle size measurement. The detailed measurement procedure is described in Saberi et al., *J. Colloid and Interface Sci.* (2013), 95-102.

Emulsion I contained flavor oil drops having a particle size of 123 nanometers at time 0 and 20 nanometers after 1 day. Not to be bound by any theory, it is believed that a significant part of the flavor oil was dissolved in the aqueous phase, resulting in the decrease of the particle size of the flavor oil droplets.

Example 6

Emulsion II of this invention was prepared following the same procedure as Emulsion I, except that 2.5% Composition 4, instead of Composition 3, was used.

Emulsion II contained flavor oil drops having a particle size of 116 nanometers at time 0 and 30 nanometers after 1 day.

Example 7

Emulsion III of this invention was prepared following the same procedure as Emulsion I, except that 1.6% Composition 3 and 0.4% PC75 (commercially available from American Lecithin Company, Oxford, Conn.; containing 1.1% LPC), instead of Composition 3, was used.

Emulsion III contained flavor oil drops having a particle size of 113 nanometers at time 0 and 36 nanometers after 1 day.

Example 8

Emulsion IV of this invention was prepared following the same procedure as Emulsion I, except that 1.25% Composition 4, instead of Composition 3, was used.

Emulsion IV contained flavor oil drops having a particle size of 138 nanometers at time 0 and 27 nanometers after 1 day.

Comparative Emulsion I'

Comparative Emulsion I' was prepared following the same procedure as Emulsion I, except that 2.5% Alcolec LPC50 (a lecithin composition commercially available from American Lecithin Company, Oxford, Conn.; containing LPC 1.3%), instead of Composition 3, was used.

Comparative Emulsion I' contained flavor oil drops having a particle size of 130 nanometers at time 0 and 193 nanometers after 1 day.

Example 9

A beverage of this invention, i.e., Beverage A, was prepared following the procedure described below.

More specifically, 0.1% (wt/vol) of Emulsion I was added to a beverage solution under mixing using an overhead mixer until fully dispersed. The beverage formulation is shown in Table 2 below.

TABLE 2

| Ingredietns | g/L |
| --- | --- |
| Emulsion | 1 |
| Sugar syrup 67° Brix | 150 |
| Citric acid 50% solution | 3 |
| Water | q.s. to 1 L |

The clarity of Beverage A was measured using a turbidimeter (HACH Model 2100Q) with the unit of Nephelometric Turbidity Units ("NTU") specified by United States Environmental Protection Agency. The measurement was carried out following the procedure described in the "Turbidity Measurement" section of the Owner Instruction Manual of the turbidimeter. Beverage A had a clarity of 3.49 at time 0 and 1.32 after 1 day.

Example 10

Beverage B of this invention was prepared following the same procedure as Beverage A, except that Emulsion II, instead of Emulsion I, was used.

Beverage B had a clarity of 2.44 at time 0 and 0.95 after 1 day.

Example 11

Beverage C of this invention was prepared following the same procedure as Beverage A, except that Emulsion III, instead of Emulsion I, was used.

Beverage C had a clarity of 4.32 at time 0 and 1.53 after 1 day.

Example 12

Beverage D of this invention was prepared following the same procedure as Beverage A, except that Emulsion IV, instead of Emulsion I, was used.

Beverage D had a clarity of 7.87 at time 0 and 1.06 after 7 days.

Comparative Beverage a'

Comparative Beverage A' of this invention was prepared following the same procedure as Beverage A, except that Comparative Emulsion I', instead of Emulsion I, was used.

Comparative Beverage A' had a clarity of 9.68 at time 0 and 4.13 after 1 day.

Stability

Emulsion I was stable for at least 4 months as indicated by the appearance and the particle size.

This emulsion was stored in a glass flask at 25° C. for 4 months. After the storage, Emulsion I remained homogeneous without any oil/solid precipitation. The particle size of the oil drops was 99.3 nm, in consistent with the initial particle size.

Taste Perpromance

Beverages II and IV were compared with a commercial orange drink, i.e., Crystal (Commercially available from International Flavors and Fragrances, Union Beach, N.J.).

All three beverages were tasted by 12 trained panelists. The attributes of the tastes were rated using Labeled Magnitude Scale (LMS) by a score of 1-100. A score of 5 indicates a barely detectable taste/smell, a score of 6 indicates a weak taste/smell, and a score of 17 indicates a moderate taste/smell.

The LMS covers all possible odor/taste/mouth feeling ratings from no sensation to the strongest ever experienced. The scale contains commonly used terms such as weak, moderate, strong, very strong. The top of the scale is the "Strongest Ever Experienced", which represents the strongest odors/tastes/mouth feeling that you have ever experienced. Below are some examples of LMS ratings: smell/taste of whole milk—weak, and smell/tastes of black coffee—moderate to strong but closer to moderate.

A desirable score for ready-to-drinks is between 6 and 15. All commercial ready-to-drinks were scored at 8-13 by the panelists in this evaluation. The results are shown in Table 3 below.

TABLE 3

| Beverage | Orange Aroma | Off Odors | Orange Flavor | Off Flavors |
| --- | --- | --- | --- | --- |
| Crystal | 8.3 | 0.8 | 8.9 | 1.2 |
| II | 7.7 | 1.0 | 8.6 | 1.7 |
| IV | 8.1 | 0.5 | 8.8 | 1.4 |

Both Beverages II and IV showed a strong orange aroma and flavor as compared to the commercial product. Their off odors and off flavors were insignificant. Further, Beverage IV showed off odors less than that of the commercial product.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Indeed, to prepare a lysolecithin composition suitable as an emulsifier, one skilled in the art can select a suitable concentration for each of ethanol, phospholipase, and lecithin. Further, the reaction temperature, duration, and deactivation method can also be determined by a skilled artisan through assays known in the art.

From the above description, a skilled artisan can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of preparing a lysolecithin composition, the method comprising the steps of:
   (a) providing a lecithin mixture including a lecithin, water, and ethanol, wherein the lecithin contains phospholipids at least 60% by weight of the lecithin, and ethanol is present at 6 to 40% by weight of the lecithin mixture;
   (b) adding phospholipase A1 or A2 to the lecithin mixture; and (c) allowing an enzymatic reaction to occur so that at least 70% of the phospholipids are converted to lysophospholipids to obtain the lysolecithin composition.

2. The method of claim 1, further comprising:
(d) after the enzymatic reaction, deactivating phospholipase A1 or A2 to obtain a product mixture;
(e) adding acetone to the product mixture to obtain a process mixture containing a lysolecithin phase; and
(f) collecting the lysolecithin phase to obtain the lysolecithin composition.

3. The method of claim 2, further comprising the step of, after step (e) and before step (f), storing the process mixture at a temperature of 10° C. or below for a period of at least 10 minutes.

4. The method of claim 2, wherein the lysolecithin composition is washed with acetone for at least three times.

5. The method of claim 2, wherein, in step (e), the weight ratio between acetone and the product mixture is 5:1 to 1:10.

6. The method of claim 1, wherein the phospholipase A1 or A2 is present at 1 to 15% by weight of the lecithin mixture.

7. The method of claim 1, wherein the enzymatic reaction is occurred at a temperature of 25 to 50° C., for a period of 1 to 24 hours.

8. The method of claim 1, wherein the lysolecithin composition contains (i) lysophospholipids 50 wt % or greater, (ii) free fatty acids 15 wt % or less, and (iii) glycerophosphocholine 20 wt % or less.

9. The method of claim 1, wherein the lecithin contains at least 80 wt % of the phospholipids, at least 90 wt % of the phospholipids are converted to the lysophospholipids, ethanol is present at 10 to 15% by weight of the lecithin mixture, and the enzymatic reaction is occurred at a temperature of 35 to 45° C. for a period of 2 to 10 hours.

10. A lysolecithin composition prepared by the method of claim 1.

* * * * *